Jan. 28, 1947. W. J. MATTOX 2,414,962
MANUFACTURE OF BUTADIENES
Filed July 31, 1940
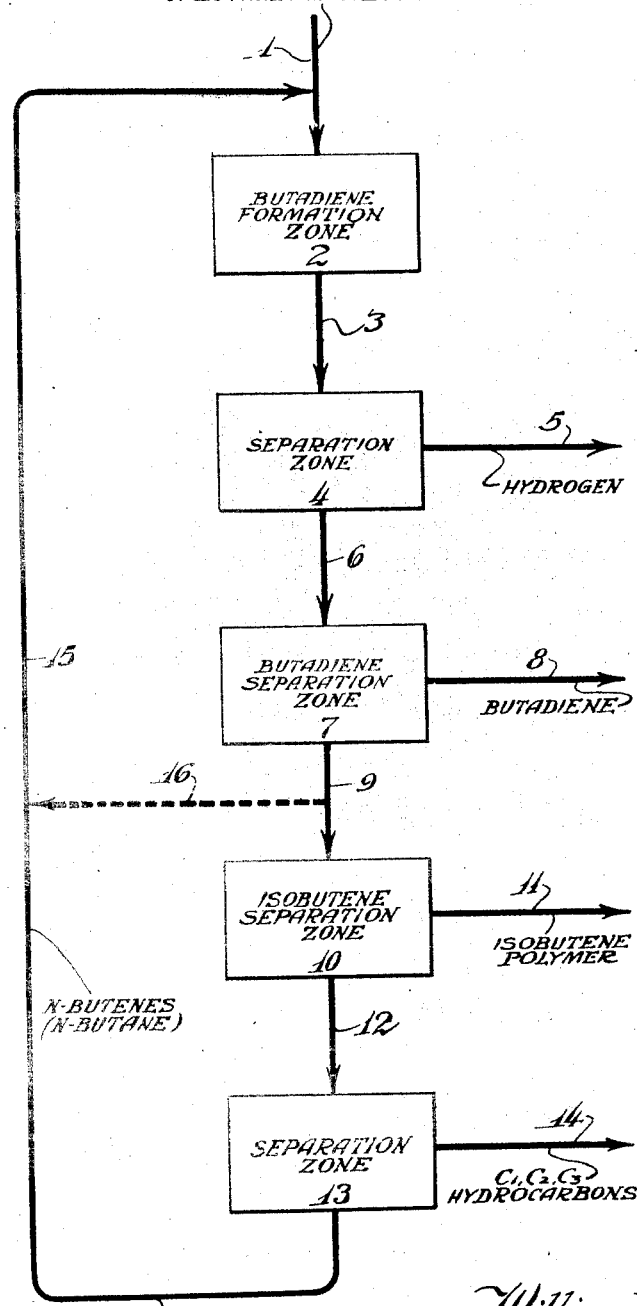
INVENTOR.
William J. Mattox
BY Lee J. Gary
Attorney Patented Jan. 28, 1947

2,414,962

UNITED STATES PATENT OFFICE 2,414,962

MANUFACTURE OF BUTADIENES

William J. Mattox, Chicago, Ill., assignor to Universal Oil Products Company, Chicago, Ill., a corporation of Delaware Application July 31, 1940, Serial No. 348,976

5 Claims. (Cl. 260—680)

This invention relates particularly to the manufacture of butadienes from normal butane, normal butene or mixtures of normal butenes and normal butane.

More specifically the invention is concerned with an improvement in the present process for preparing butadiene by catalytic dehydrogenation. In the catalytic dehydrogenation of normal butenes or mixtures of normal butenes and normal butane, a number of side reactions take place. One of the most important side reactions in the presence of catalysts commonly used for this process is the isomerization of the normal butenes to isobutene. As the isobutene is not readily dehydrogenated to butadiene, its presence results in the formation of carbon upon the catalyst, which fact tends to decrease its life as well as to reduce its activity. The decomposition of isobutene also results in the liberation of hydrogen which has a depressing effect upon the formation of butadiene.

The present invention is related to the problem of producing synthetic rubber from the $C_4$ hydrocarbons obtained in the production and the refining of petroleum. Large quantities of normal butane are obtained in the natural gasoline industry. The production of gasoline by thermal or catalytic cracking produces further large quantities of normal butane as well as normal butenes. As a result of considerable research work, special catalysts have been developed which selectively promote the dehydrogenation of the normal butane and the normal butenes with the subsequent formation of butadiene. These dehydrogenation reactions take place with the production of a certain amount of undesirable by-products. A certain amount of cracking takes place with the formation of methane as well as the $C_2$ and $C_3$ hydrocarbons. The preferred catalysts for this dehydrogenation reaction also exert a certain isomerizing effect upon the normal butenes, converting them to isobutene.

In one specific embodiment this invention comprises a process for the production of butadiene which comprises subjecting normal $C_4$ hydrocarbons of higher hydrogen content to contact with a catalyst under conditions suitable for the production of substantial yields of butadiene, separating from the products of said catalytic step hydrogen and butadiene, and subjecting the residual gases to a separation step to remove the isobutene and the $C_1$, $C_2$ and $C_3$ hydrocarbons and returning the remaining normal $C_4$ hydrocarbons to the butadiene formation zone.

The preferred catalysts for this invention are characterized by the use of a particular group of composite catalytic materials which employ as their base certain refractory oxides and silicates which in themselves may have some slight specific catalytic ability in the dehydrogenating reactions, but which are greatly improved in this respect by the addition of certain promoters or secondary catalysts in minor proportions which comprise the compounds and preferably the oxides of the elements in the left-hand columns of groups 4, 5 and 6 of the periodic table. These active compounds and promoters which are used in the catalyst composite of the present invention include generally compounds and particularly the oxides of chromium, molybdenum, tungsten, uranium, vanadium and cerium. The base supporting materials for these compounds are preferably of a rugged and refractory character, capable of withstanding the severe use to which the catalysts are put in regard to temperature during service and in regeneration by means of air or other oxidizing gas mixtures after they have become fouled by carbonaceous deposits after a period of service. As examples of materials which may be employed in granular form as supports for the preferred catalytic substances, may be mentioned the following:

Magnesium oxide
Aluminum oxide
Bauxite
Bentonite clays
Montmorillonite clays
Kieselguhr
Crushed silica
Crushed firebrick
Glauconite (greensand)

The conversion products in the catalytic formation of butadiene by dehydrogenation include a number of $C_4$ hydrocarbons whose boiling points are very close together. The difficulty in separating these substances by distillation is apparent from an examination of their boiling points which are given in the following table:

| | °C. |
|---|---|
| Isobutene | −7.5 |
| Butene$_1$ | −6.7 |
| Butadiene | −4.7 |
| n-Butane | −0.6 |
| Butene$_2$, trans | +1.0 |
| Butene$_2$, cis | +3.7 |

In the process of my invention the products from the dehydrogenation zone are subjected to a separation step for the removal of hydrogen. This is usually accomplished by subjecting the reaction products to contact with an absorption oil which dissolves the hydrocarbons, the hydrogen being only slightly soluble therein. After removal of the hydrogen, the butadiene is removed from the hydrocarbon mixture. This may be accomplished in a number of ways. Butadiene forms an insoluble compound with cuprous chloride and certain other heavy metallic halides in univalent form, such as mercurous chloride and silver chloride. The cuprous chloride also insoluble in water will dissolve in an aqueous solution of the halides of univalent simple cations, such as those of the alkali metals, ammonium chloride, or hydrochloric acid. At temperatures of the order of −5° C. butadiene and cuprous chloride form an addition compound which is insoluble in the aqueous medium. By separating this precipitate and heating it to a temperature of 55–60° C. it may be decomposed to liberate butadiene in the very pure state. Butadiene obtained in this manner may have a purity of 95–98%. Other methods for separating butadiene from the hydrocarbon gases may be used. These methods comprise azeotropic distillation with third components or solvent extraction in the liquid state. A number of these methods are described in the journal and patent literature and their use is comprised in the process of my invention.

After removal of the butadiene my invention comprises next the removal of isobutene by reagents and conditions selective to this removal and unreactive toward the normal butenes present.

By contacting the hydrocarbon fraction after removal of butadiene with sulfuric acid of a concentration of 60–70% acid and preferably within a temperature range of 20–40° C., isobutene may be selectively removed in the presence of normal butenes. The acid layer containing the dissolved isobutene may be heated to 100° C. at which temperature the dissolved isobutene polymerizes to form iso-octene. If desired, this iso-octene may be hydrogenated to form iso-octane with an octane number of 97 or 98 by the C. F. R. motor method. Isobutene may also be removed selectively by the action of anhydrous hydrogen chloride which forms tertiary butyl chloride. A precalcined mixture of phosphoric acid supported on a siliceous adsorbent may also be used to selectively polymerize isobutene in the presence of normal butenes. After removal of the isobutene, the residual $C_4$ hydrocarbons are returned to the butadiene formation zone.

The accompanying flow diagram illustrates the relationship of the various steps of the process. As shown in the drawing, normal butane, normal butenes, or a mixture of normal butane and normal butenes is supplied to the system through line 1 wherein they are commingled with a recycle stock of $C_4$ hydrocarbons containing normal butenes and perhaps normal butane. This mixture of normal $C_4$ hydrocarbons is supplied to butadiene-formation zone 2. When using the preferred catalyst for dehydrogenation of normal butane, normal butenes or their mixtures the temperature will be within the approximate limits of 500–700° C. and absolute pressure within the approximate limits of 15 to 760 mm. The time of contact varies with the temperature and pressure, the general range of space velocity being from about 500–10,000 volumes of charging stock calculated at normal temperature and pressure per hour per volume of catalyst. The amount of butadiene formed per pass varies from about 7–30 mol per cent of the normal $C_4$ hydrocarbons.

The conversion products leaving the butadiene formation zone are cooled and subjected to a separation step for the removal of the hydrogen. As shown in the flow diagram the reaction products are removed from dehydrogenation zone 2 by way of line 3 from which they are directed to separation zone 4 from which the hydrogen is removed by way of line 5. As hereinbefore set forth, the hydrogen may be separated from the hydrocarbons by dissolving the latter in the hydrocarbon absorption oil. These dissolved hydrocarbons may then be removed from the absorption oil by stripping, using methods well developed in the art. After removal of the hydrogen the hydrocarbons leave separation zone 4 by way of line 6 from which they are directed to the butadiene separation zone 7. Butadiene is removed from the hydrocarbon mixture by azeotropic distillation, solvent extraction or by the formation of an insoluble complex of cuprous chloride or a chloride of univalent heavy metal cations, such as mercurous mercury or silver. The butadiene is removed from the system by way of line 8 as shown in the drawing. After removal of the butadiene, residual hydrocarbons are removed from zone 7 by way of line 9 from which they may be directed to zone 10 for the removal of isobutene. As hereinbefore set forth the isobutene may be polymerized selectively in the presence of sulfuric acid of a concentration of 60–70% and preferably within a temperature range of 20–40%. When using a precalcined mixture of phosphoric acid adsorbed on a siliceous adsorbent, temperatures within the approximate limits of 225–250° F. and pressures within the approximate limits of 100–1000 pounds per square inch may be used. The polymer formed consists principally of iso-octenes and is removed from the system by way of line 11. The hydrogen separated in zone 4 may be used to hydrogenate this polymer to form iso-octanes suitable for use as an aviation fuel. After removal of the isobutene the hydrocarbons are directed by way of line 12 to separation zone 13 wherein the light gaseous hydrocarbons from methane to propane, inclusive, are removed. This step involves simple fractional distillation and is well known in the art. These light gaseous hydrocarbons are removed from the system by way of line 14. The depropanized hydrocarbons consisting principally of normal butenes, with or without appreciable quantities of normal butane, are directed by way of line 15 to line 1 for commingling with the charging stock to form the combined feed for the process. If desired, a portion only of the hydrocarbon mixture after separation of butadiene is subjected to the isobutene and depropanizing steps, the remaining portion being diverted from line 9 by way of line 16, supplying line 15.

The following example is an illustration of the process of my invention, although the invention is not limited to the exact conditions indicated in the example or to the charging stock used. A charging stock of normal butenes is subjected to contact with a catalyst consisting of chromium oxide deposited on alumina at a temperature of 625° C. and a contact time of 0.026 second. This catalyst is prepared by impregnating pelleted alumina with a chromic acid solution followed by heating to remove the water and to convert the chromic acid to chromium sesquioxide. The resulting catalyst analyzed 92% by weight of alumina and 8% chromium sesquioxide. The average pressure on the reactivating gases was 63 mm. The products leaving the dehydrogenation zone have the following analysis:

| | Per cent |
|---|---|
| Butadiene | 17.8 |
| Hydrogen | 24.5 |
| n-Butenes | 46.3 |
| i-Butene | 4.9 |
| n-Butane | 1.0 |
| $C_2+C_3$ | 3.1 |
| $CH_4$ | 1.9 |
| $C_5$ | 0.5 |

After removal of the light gases, the residual gases have the composition:

| | Per cent |
|---|---|
| Butadiene | 25.4 |
| n-Butenes | 66.2 |
| i-Butene | 7.0 |
| n-Butane | 1.4 |

This $C_4$ fraction is then subjected to contact with an aqueous solution containing 10 g. cuprous chloride, 20 g. ammonium chloride in 100 g. water at a temperature of −5° C. The insoluble cuprous chloride addition compound is removed from the aqueous layer and decomposed by heating to 65° C. The liberated butadiene may have a purity of approximately 95%. After removal of the butadiene, the remaining $C_4$ fraction may have a composition of:

| | Per cent |
|---|---|
| Butadiene | 2.8 |
| n-Butenes | 86.2 |
| i-Butene | 9.1 |
| n-Butane | 1.9 |

This $C_4$ fraction is then scrubbed with 65% sulfuric acid at a temperature of 35° C. The isobutene dissolves selectively in the sulfuric acid, only a minor amount of normal butenes being removed in this manner. The deisobutenized hydrocarbons may have a composition of:

| | Per cent |
|---|---|
| Butadiene | 2.3 |
| n-Butenes | 95.7 |
| i-Butene | 0.6 |
| n-Butane | 1.4 |

This deisobutenized hydrocarbon fraction is then returned to the catalytic dehyrogenation zone. The ultimate yield of butadiene obtained by this process may be 65% of the normal butene charging stock.

I claim:

1. In a process for the dehydrogenation of a mixture comprising normal butane and normal butene to form butadiene, wherein isobutene is formed incidental to the formation of said butadiene, the butadiene separated from unconverted normal butane and normal butene and said unconverted normal butane and normal butene returned to the dehydrogenation step for further dehydrogenation, the improved method of operation which comprises separating said isobutene from the unconverted normal butane and normal butene before their return to the dehydrogenation step.

2. The method of claim 1 further characterized in that isobutene separation is accomplished by sulfuric acid absorption.

3. In a process for the dehydrogenation of normal butene to form butadiene, wherein isobutene is formed incidental to the formation of said butadiene, the butadiene separated from unconverted normal butene and the isobutene, and said unconverted normal butene and isobutene returned to the dehydrogenation step for further dehydrogenation, the improved method of operation which comprises separating said isobutene from the unconverted normal butene and returning only the latter to the dehydrogenation step.

4. A process for producing more valuable products from a mixture comprising normal butane and normal butene, which comprises subjecting said mixture to dehydrogenation to form butadiene, whereby a minor amount of isobutene and lower boiling gaseous products are formed incidental to the formation of butadiene, separating said butadiene from the resulting conversion products, separating said isobutene and said lower boiling gaseous products from the remaining conversion products and returning the latter to the dehydrogenation step.

5. In the production of butadiene by the dehydrogenation of a normal $C_4$ hydrocarbon containing at least 8 hydrogen atoms per molecule, wherein isobutene is formed in the dehydrogenation step incidental to the formation of the butadiene, the butadiene separated from unconverted $C_4$ hydrocarbon and the latter recycled to the dehydrogenation step for further dehydrogenation, the improvement which comprises separating from the products of the dehydrogenation step a fraction containing said unconverted normal $C_4$ hydrocarbon and isobutene, treating at least a portion of said fraction to separate the isobutene contained therein, and returning the thus treated portion of said fraction to the dehydrogenation step.

WILLIAM J. MATTOX.